July 15, 1952        J. L. COONEY        2,603,353

MAGNETIC FILTER FOR FLUID LINES

Filed June 4, 1946

INVENTOR.
John L. Cooney
BY
Floran L. Miller
Atty.

UNITED STATES PATENT OFFICE 2,603,353

MAGNETIC FILTER FOR FLUID LINES

John L. Cooney, Erie, Pa.

Application June 4, 1946, Serial No. 674,186

1 Claim. (Cl. 210—1.5)

This invention relates generally to filters in a fluid line, and it relates more particularly to magnetic filters in a fluid line.

Filters have been provided in a fluid line which comprised a screen member but it has been found that minute metal particles often pass through the screen, which damages nozzles and the like, through which the fluid passes. Magnets have been provided on the outside of a straight fluid line to attract metal particles, but these have not been practical, inasmuch as the pressure of the fluid carried much of the metal particles past the magnets and scavenging of the metal particles from the fluid line has been difficult and impractical.

It is, accordingly, an object of my invention to overcome the above and other defects in filters for a fluid line, and it is more particularly an object of my invention to provide a magnetic filter or separator for solid matter in fluid lines which is simple in construction, economical in cost, economical in manufacture, efficient in operation, easy to install and easy to clean.

Another object of my invention is to provide a magnetic filter for a fluid line which permits a maximum flow of fluid through the line.

Another object of my invention is to provide a magnet which may be snapped on and off of a fitting in a fluid line.

Another object of my invention is to provide a novel screen in a fluid line, in combination with a magnet, disposed externally of the fluid line.

Other objects of my invention will become evident from the following detailed description, taken in conjunction with the accompanying drawings, in which Fig. 1 is a side elevational view of my novel magnetic member disposed on a fitting.

Fig. 4 is an exploded view of my novel magnetic filter assembly.

Figure 2:
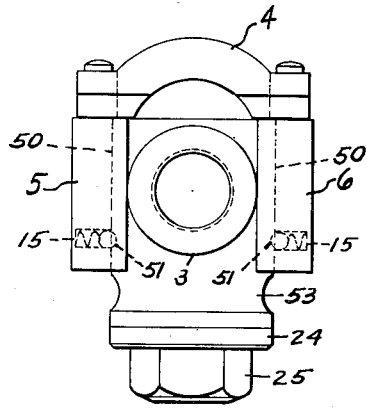
Fig. 2 is an end elevational view showing my novel magnetic member disposed on a fitting.
Figure 1:
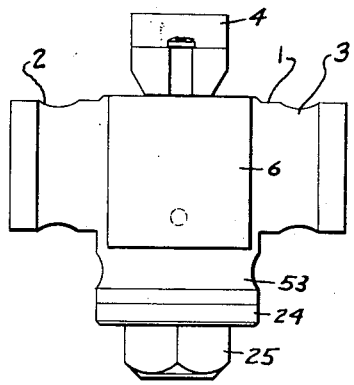

Referring now to the drawings, Figs. 1 to 4, inclusive, show fitting 1 for disposal in a fluid line, having threaded ends 2 and 3 and a cylindrical outer surface 50 with oppositely disposed spherical shaped recesses 51. A U-shaped magnet, comprising a connecting cross-piece 4 and depending arcuate shaped legs 5 and 6, is adapted to be disposed over the outer cylindrical surface 50 of the fitting 1. The depending legs 5 and 6 have threaded, vertically extending apertures 7 and 8 for threadably engaging screw bolts 9 and 10, for connecting the cross-member 4 and the legs 5 and 6. The inner portions 12 and 13 of the legs 5 and 6 are arcuate in shape, conforming with the contour of the outer cylindrical surface 50 of the fitting 1. The legs 5 and 6 have laterally extending recesses 14 and 15 for receiving spring and ball members 16, 17, 18, and 19. The ball members 16 and 18 engage the recesses 51 in the fitting 1 to secure the U-shaped magnet on the fitting 1. The frictional engagement of the inner surfaces 12 and 13 of legs 5 and 6 is sufficient to secure the magnet on the fitting 1. It will be evident that any suitable means may be provided to secure the magnet on the fitting 1, and my magnetic member may take different forms and shapes without departing from the spirit of my invention.

Figure 3:
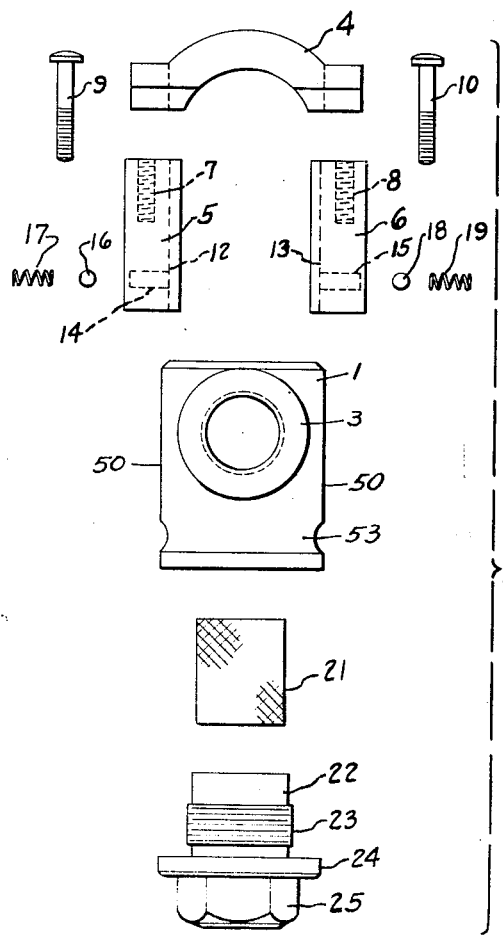
Fig. 3 is a vertical sectional view of my novel magnetic filter assembly.
Figure 3:
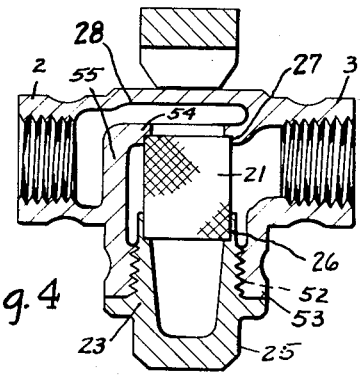

A screen 21 is disposed vertically in the fitting 1, as shown in Fig. 3, with the bottom end thereof seated in a countersunk portion 22 of a screw plug 23 having a flanged portion 24 and a wrench engaging portion 25 which threadably engages the threaded portion 52 of a laterally extending section 53 of the fitting 1. The upper end of the screen 21 seats in a counter-sunk portion 27 formed in the horizontal apertured wall section 54 of the fitting 1. A passage 28 above the screen 21 and the apertured wall section 54 carries fluid to the end 2 of the fitting 1. Except for the magnetic member, all parts of my novel magnetic filter assembly are preferably non-magnetic. The flow of fluid in my novel magnetic filter assembly is from the end 3 of the fitting 1 laterally through the screen 21 and then upwardly to the passage 28 and out through the end 2 of the fitting 1. The direction of flow is opposite to the normal direction of flow, in order that metal particles may have sufficient wall area surrounding the screen 21, wherein they may be held by magnetic attraction of the magnetic member externally of the fitting 1. A vertical wall 55 is integral with the horizontal wall 54 and is spaced from the screen 21.

In operation, my novel magnetic filter assembly is assembled as shown in Fig. 3 with the U-shaped magnetic member snapped over the outer cylindrical surface 50 of the fitting 1. The flow of fluid is from end 3 of the fitting 1 laterally through the screen 21 and then upwardly to the passage 28 and out through the end 2 of the fitting 1. Metal particles cling to the wall 55 in the fitting 1 through the attraction of the magnetic member. When it is desired to scavenge my novel magnetic filter assembly the magnetic member is pulled out of engagement with the outer cylindrical surface 50 of the fitting 1 and the screw plug member 22 is disengaged, wherein the metal particles clinging to the inner wall 55 of the fitting 1 will fall through the opening in the lateral section 53 of the fitting 1. A cloth, brush, or any other suitable means may be utilized for cleaning the screen 21 and the inner wall 54 of the fitting 1.

It will be evident from the foregoing that I have provided a novel magnetic filter, wherein the magnetic member is easily assembled and disassembled, wherein the magnetic member is disposed in its most advantageous position in regard to a fluid line, wherein a screen is disposed internally of a fluid line in cooperation with an external magnetic member, and wherein a sufficient area is provided in the fluid line, out of direct contact with the flowing fluid, to hold a maximum amount of metallic particles in suspension in the fluid line, due to the attraction of the magnetic member disposed externally thereof.

I have further provided a novel external surface for a fitting to permit maximum contact with the arcuate surfaces of the legs of a U-shaped magnet.

Various changes may be made in the specific embodiment of my invention without departing from the spirit thereof, or from the scope of the appended claim.

What I claim is:

A magnetic filter for a fluid line comprising a fluid line, a vertically disposed fitting in said fluid line having a downwardly inclined inlet passageway and an outlet passageway, the opposite sides of said fitting parallel to the axis thereof having oppositely disposed, parallel flat sides with opposed recesses therein, a vertically extending inner wall in said fitting intermediate said inlet passageway and said outlet passageway and a horizontally extending inner wall portion with a countersunk central aperture, said horizontal wall portion being spaced from the outer side of said fitting to define a horizontally extending passageway for fluid, a vertically extending cylindrical screen having the upper end thereof seated in the countersunk portion of said horizontal wall member disposed in the path of said downwardly inclined inlet passageway, a removable screw plug on said fitting having a well with a countersunk portion on the upper end thereof for seating the bottom end of said cylindrical screen member, said screen being spaced from said vertically extending wall portion of said fitting, a U-shaped magnet having parallel inner sides corresponding to the parallel outer sides of said fitting disposed externally of said fitting with the parallel inner sides thereof disposed parallel to said screen whereby the magnetic lines of force between the pole faces thereof pass transversely of the lower portion of said screen and the flow of fluid, and spring urged camming members carried by said U-shaped magnet engageable with the recesses in the parallel outer sides of said fitting for detachably securing said magnet to the flat sides of said fitting.

JOHN L. COONEY.

REFERENCES CITED

The following references are of record in the file of this patent:

UNITED STATES PATENTS

| Number | Name | Date |
|---|---|---|
| 263,131 | Edison | Aug. 22, 1882 |
| 542,911 | Whitacre, et al. | July 16, 1895 |
| 675,711 | Brophy | June 4, 1901 |
| 755,325 | Soutar | Mar. 22, 1904 |
| 1,148,990 | Rogers | Aug. 3, 1915 |
| 1,251,601 | Weiwoda | Jan. 1, 1918 |
| 1,602,935 | Rasey | Oct. 12, 1926 |
| 1,606,356 | Fisher | Nov. 9, 1926 |
| 1,849,582 | Sundborg | Mar. 15, 1932 |
| 2,348,380 | Graham | May 9, 1944 |
| 2,358,612 | Acker | Sept. 19, 1944 |
| 2,399,994 | Feagin | May 7, 1946 |

FOREIGN PATENTS

| Number | Country | Date |
|---|---|---|
| 478,770 | Germany | July 2, 1929 |
| 557,626 | Great Britain | Nov. 29, 1943 |